(12) United States Patent
Ruehle (10) Patent No.: US 6,922,717 B2
(45) Date of Patent: Jul. 26, 2005

(54) METHOD AND APPARATUS FOR PERFORMING MODULAR MULTIPLICATION

(75) Inventor: Michael D. Ruehle, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 628 days.

(21) Appl. No.: 09/965,916

(22) Filed: Sep. 28, 2001

(65) Prior Publication Data

US 2003/0065813 A1 Apr. 3, 2003

(51) Int. Cl.[7] ................................................ G06F 7/52
(52) U.S. Cl. ..................................................... 708/620
(58) Field of Search ............................... 708/620, 522, 708/509, 492, 490, 491

(56) References Cited

U.S. PATENT DOCUMENTS

| | | | |
|---|---|---|---|
| 4,218,582 A | | 8/1980 | Hellman et al. |
| 4,493,048 A | * | 1/1985 | Kung et al. .................. 708/607 |
| 4,686,645 A | * | 8/1987 | McCanny et al. .......... 708/620 |
| 4,707,800 A | | 11/1987 | Montrone et al. |
| 4,737,926 A | | 4/1988 | Vo et al. |
| 4,748,583 A | * | 5/1988 | Noll ............................ 708/626 |
| 4,799,182 A | * | 1/1989 | Marwood .................... 708/503 |
| 4,914,617 A | | 4/1990 | Putrino et al. |
| 5,047,975 A | | 9/1991 | Patti et al. |
| 5,189,636 A | | 2/1993 | Patti et al. |
| 5,289,397 A | | 2/1994 | Clark et al. |
| 5,327,369 A | | 7/1994 | Ashkenazi |
| 5,623,683 A | | 4/1997 | Pandya |
| 5,870,478 A | | 2/1999 | Kawamura |
| 6,035,317 A | | 3/2000 | Guy |
| 6,061,706 A | | 5/2000 | Gai et al. |
| 6,151,393 A | | 11/2000 | Jeong |
| 6,209,016 B1 | | 3/2001 | Hobson et al. |
| 6,219,815 B1 | * | 4/2001 | DesJardins et al. ......... 708/492 |
| 6,240,436 B1 | | 5/2001 | McGregor |
| 6,356,636 B1 | * | 3/2002 | Foster et al. ................ 708/492 |
| 6,625,631 B2 | * | 9/2003 | Ruehle ........................ 708/491 |
| 6,662,201 B1 | * | 12/2003 | Kawamura .................. 708/491 |
| 6,732,133 B2 | * | 5/2004 | Ruehle ........................ 708/491 |
| 6,804,696 B2 | * | 10/2004 | Chen et al. .................. 708/491 |

OTHER PUBLICATIONS

Weixin et al., A systolic linear array for modular multiplication, Oct. 1996, IEEE ASIC 2nd International Conference, pp. 171–174.*

Lyh et al., Design and implementation of an RSA public–key cryptosystem, 1999, IEEE, pp. I–504 to I–507.*

Bajard, Jean–Claude et al., "An RNS' Montgomery Modular Multiplication Algorithm", Abstract, Nov. 1996, pp. 1–10.

Blum, Thomas, "Modular Exponentiation on Reconfigurable Hardware", Thesis submitted to the Faculty of the Worcester Polytechnic Institute, Apr. 8, 1999.

Koc, Cetin Kaya, "RSA Hardware Implementation", Version 1.0, Aug. 1995, pp. 1–28.

(Continued)

Primary Examiner—Todo Ingberg
Assistant Examiner—Chat C. Do
(74) Attorney, Agent, or Firm—Jeffrey B. Huter (57) ABSTRACT

A method and apparatus for performing modular multiplication is disclosed. An apparatus in accordance with one embodiment of the present invention includes a modular multiplier including a plurality of independent computation channels, where the plurality of independent computation channels includes a first computation channel and a second computation channel, and a coupling device interposed between the first computation channel and the second computation channel to receive a control signal and to couple the first computation channel to the second computation channel in response to a receipt of the control signal.

35 Claims, 6 Drawing Sheets-

OTHER PUBLICATIONS

Rivest, R.L. et al., "A Method for Obtaining Digital Signatures and Public–Key Cryptosystems", Abstract, pp. 1–15.

Walter, C.D., Systolic Modular Multiplication, IEEE Transactions on Computers, IEEE Inc., New York, US, vol. 42, No. 3, Mar. 1, 1993, pp. 376–378.

* cited by examiner

| CYCLE | MUX SELECT | END LOGIC | PE-6 | PE-5 | PE-4 | PE-3 | PE-2 | PE-1 | PE-0 | INPUT REGS |
|---|---|---|---|---|---|---|---|---|---|---|
| 1 | 0 | | | | | | | | | |
| 2 | 1 | | | | | | | | 0 | |
| 3 | 0 | | | | | | | | 0 | |
| 4 | 1 | | | | | | | 1 | 0 | |
| 5 | 0 | | | | | | | 1 | 0 | |
| 6 | 1 | | | | | | 2 | 1 | 0 | |
| 7 | 0 | | | | | 3 | 2 | 1 | 0 | |
| 8 | 1 | | | | 4 | 3 | 2 | 1 | 0 | |
| 9 | 0 | | | 5 | 4 | 3 | 2 | 1 | 0,7 | |
| 10 | 1 | | 6 | 5 | 4 | 3 | 2 | 1 | 0 | |
| 11 | 0 | | 6 | 5,12 | 4,11 | 3,10 | 2,9 | 1,8 | 0,7 | |
| 12 | 1 | | 6,13 | 5 | 4 | 3 | 2 | 1 | 0 | |
| 13 | 0 | | 6 | 5,12 | 4,11 | 3,10 | 2,9 | 1,8 | 0,7 | |
| 14 | 1 | | 6,13 | 5 | 4 | 3 | 2 | 1 | 0 | |
| 15 | 0 | | 6 | 5,12 | 4,11 | 3,10 | 2,9 | 1,8 | 0,7 | |
| 16 | 1 | | 6,13 | 5 | 4 | 3 | 2 | 1 | 0 | |
| 17 | 0 | | 6 | 5,12 | 4,11 | 3,10 | 2,9 | 1,8 | 0,7 | |
| 18 | 1 | | 6,13 | 5 | 4 | 3 | 2 | 1 | 0 | |
| 19 | 0 | | 6 | 5,12 | 4,11 | 3,10 | 2,9 | 1,8 | 0,7 | |
| 20 | 1 | | | | | | | | 0 | |

METHOD AND APPARATUS FOR PERFORMING MODULAR MULTIPLICATION

BACKGROUND OF THE INVENTION

1. Field of the Invention

The present invention relates generally to the fields of arithmetic processing and cryptography. More particularly, the present invention relates to a method and apparatus of performing modular multiplication.

2. Description of the Related Art

Modular exponentiation and related mathematical operations are commonly used in a number of applications such as cryptography. For example, modular exponentiation of the form $X^E$ mod M is the primary operation involved in the Rivest-Shamir-Adleman (RSA) cryptographic system where X, E, and M are all large (e.g. 512 or 1024-bit) unsigned integers. Modular exponentiation, in turn, is a process of repeated modular multiplication of the form A×B mod M utilizing similarly-sized integers. One way to perform modular multiplication is to compute A×B first and then reduce the resulting product modulo M. The time and resources necessary to perform these two separate operations and to detect the resulting remainder makes this technique undesirable for large integer numbers. Modular multiplication may also be performed utilizing another technique known as "Montgomery multiplication" in which the multiplication and modular reductions operations are performed in a single step within a mathematical transform space.

Conventional modular multipliers often include a linear systolic array or "chain" of processing elements (PEs) implemented in hardware such as an application-specific integrated circuit (ASIC) or a programmable logic device such as a field programmable gate array (FPGA). In conventional modular multipliers, a given processing element performs a portion of a modular multiplication operation by processing data and then passing it to its neighboring or adjacent PEs in a given clock cycle. In the next clock cycle, the original processing element remains idle while the neighboring processing elements process the received data and pass the processed data back, after which the original processing element may spend another cycle computing. Thus, in most conventional modular multipliers, each processing element does useful work every other clock cycle and is idle the remainder of the time. In one traditional modular multiplier, these idle cycles are used to concurrently perform an additional limited modular multiplication operation where two of three operands, B and M, must be the same.

In such a modular multiplier, one set of cycles is utilized to perform a squaring operation while the other set is utilized to perform a related multiplication operation according to a well-known square-and-multiply modular exponentiation technique. In all conventional modular multipliers however, the total number of processing elements required is related to the size of the modular multiplication operands and the number of bits processed per element. For example, a 512-bit modular multiplication operation would require at least 128 4-bit processing elements whereas a 1024-bit modular multiplication operation would require at least 256. Modular multipliers typically also include a fixed number of additional processing elements and/or additional logic to perform modular multiplication operations. Consequently, modular multipliers used to perform operations on large-size operands such as that utilized in modular exponentiation-based cryptographic systems require a large amount of space and hardware resources.

BRIEF DESCRIPTION OF THE DRAWINGS

The present invention is illustrated by way of example and not limitation in the figures of the accompanying drawings in which similar references are utilized to indicate similar elements and in which.

DETAILED DESCRIPTION

A method and apparatus for performing modular multiplication are described herein. In the following detailed description, numerous specific details such as specific computer system, modular multiplier, and processing element architectures or structures are set forth in order to provide a more thorough understanding of the present invention. It should be evident however, that these and other specific details described need not be utilized to practice the present invention. Similarly, although various portions of the description refer to parts of the invention utilizing the terms 'right', 'left', 'right-hand', 'left-hand', 'rightmost', or 'leftmost', these terms refer to the relative orientation of elements as illustrated in the figures, and should not be interpreted as limitations on the physical implementation of the invention. In other circumstances, well-known structures, elements, or connections have been omitted, or have not been described in particular detail in order to avoid unnecessarily obscuring the present invention.

Figure 1:
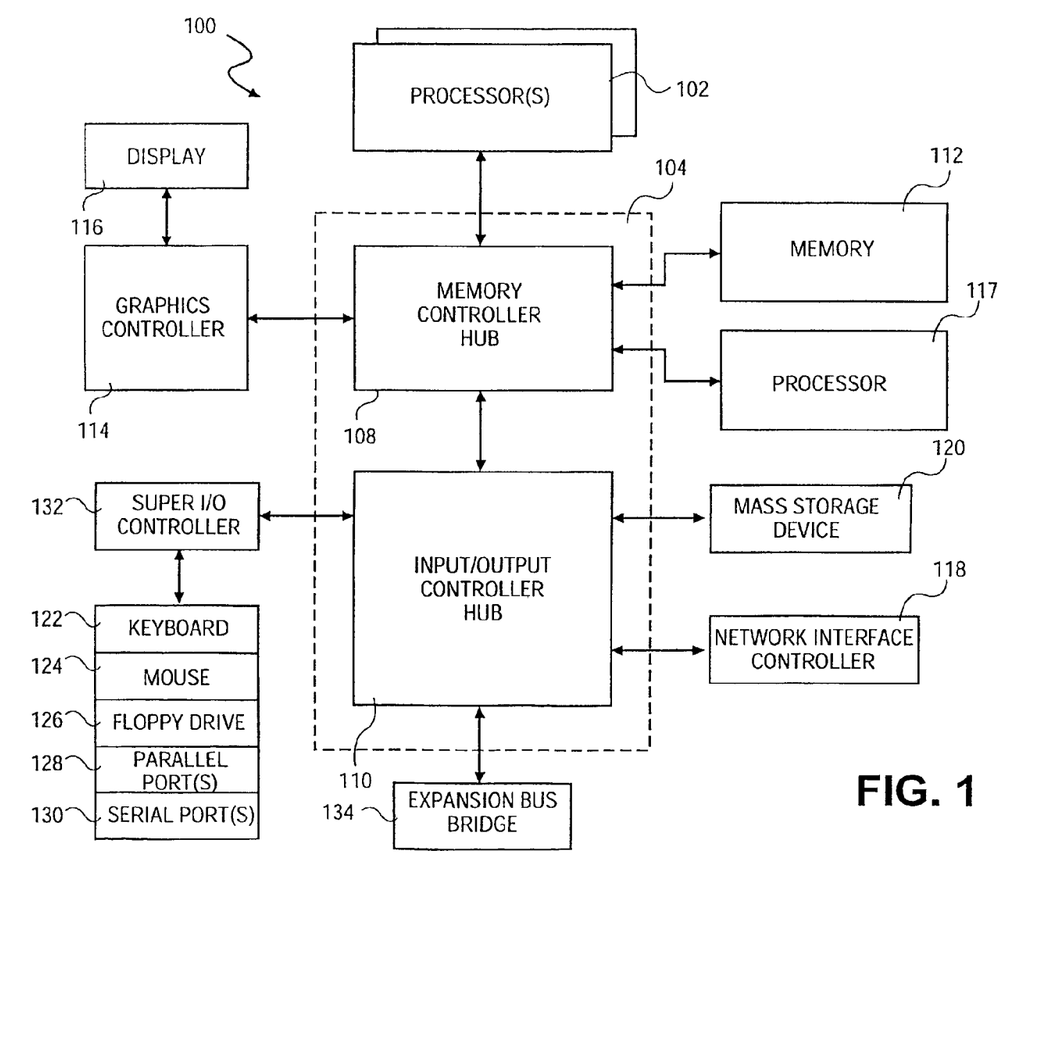
FIG. 1 illustrates an exemplary system block diagram according to one embodiment of the present invention.

FIG. 1 illustrates in block diagram form, an exemplary data processing system 100 according to one embodiment of the present invention. In the illustrated embodiment, data processing system 100 comprises one or more processors 102 and a chipset 104 coupled to a processor system bus 106. Processor(s) 102 may each comprise any suitable processor architecture and for one embodiment comprise an Intel™ Architecture, used for example, in the Pentium™ family of processors available from Intel™ Corporation of Santa Clara, Calif. Chipset 104 for one embodiment of the present invention comprises a "north bridge" or memory controller hub (MCH) 108 and a "south bridge" or input/output (I/O) controller hub (ICH) 110 coupled together as shown. MCH 108 and ICH 110 may each comprise any suitable circuitry and for one embodiment, are each formed as a separate integrated circuit chip. Chipset 104 for other embodiments may comprise any suitable one or more integrated circuit or discrete devices.

MCH 108 may comprise a suitable interface controller to provide for any suitable communication link to processor system bus 106 and/or to any suitable device or component in communication with MCH 108. MCH 108 for one embodiment provides suitable arbitration, buffering, and coherency management for each interface.

MCH 108 is coupled to processor system bus 106 and provides an interface to processor(s) 102 over the processor system bus 106. Processor(s) 102 may, in alternative embodiments of the present invention be combined with MCH 108 or chipset 104 to form a single chip. MCH 108 in one embodiment also provides an interface to a memory 112, a graphics controller 114, and a processor 117 according to the present invention, each of which is coupled to MCH 108 as illustrated. Memory 112 is capable of storing data and/or instructions executable on a processor such as processor 102 or 117 of data processing system 100 and may comprise any suitable memory such as dynamic random access memory (DRAM) for example. Graphics controller 114 controls the display of information on a suitable display 116, such as a cathode ray tube (CRT) or liquid crystal display (LCD) for example, coupled to graphics controller 114. In the illustrated embodiment, MCH 108 interfaces with graphics controller 114 through an accelerated graphics port. However, it will be appreciated that the present invention may be practiced using any suitable graphics bus or port standard. Graphics controller 114 for one embodiment may alternatively be combined with MCH 108 to form a single chip.

Although processor 117 has been depicted as an independent, special-purpose or "application specific" integrated circuit chip in the described figure, in alternative embodiments of the present invention processor 117 is implemented as a programmable logic or gate array device such as a field programmable gate array (FPGA) and as a general purpose processor (e.g., one or more of processor(s) 112) programmed utilizing executable instructions embodied within a machine-readable medium to cause the general purpose processor to perform methods of the present invention.

Processor 117 is utilized, according to one embodiment of the invention, to accelerate computationally intensive tasks such as modular exponentiation and/or modular multiplication associated with encryption, decryption or authentication operations of cryptosystems such as RSA. Accordingly, in one embodiment processor 117 includes a modular multiplier including at least a first and second independent computation channel and a coupling device interposed between the first and second independent computation channels to couple the first computation channel with the second computation channel in response to a receipt of a first control signal. Processor 117 can be coupled to data processing system 100 via a well-known processor socket (not illustrated), via a dual inline memory module (DIMM) slot on a PC-100 or PC-133 memory bus coupled to MCH 108, or via an expansion bus in alternative embodiments of the present invention.

MCH 108 is also coupled to ICH 110 to provide access to ICH 110 through a hub interface. ICH 110 provides an interface to I/O devices or peripheral components for data processing system 100. ICH 110 may comprise any suitable interface controller to provide for any suitable communication link to MCH 108 and/or to any suitable device or component in communication with ICH 110. ICH 110 for one embodiment provides suitable buffering and arbitration for each interface.

In the illustrated embodiment, ICH 110 further provides an interface to a network interface controller 118, a mass store device 120, and to a keyboard 122, a mouse 124, a floppy disk drive 126, as well as additional devices via one or more standard parallel 128 or serial 130 ports through a super I/O controller 132. Network interface controller 118 or alternatively a modem codec (not illustrated) may be utilized to couple data processing system 100 to a suitable communications network via various well-known methods. Mass store device 120 may comprise any suitable device or component to store data and/or instructions such as a tape or fixed disk magnetic storage device, or an optical storage device such as a compact disk (CD) or digital versatile disk (DVD) read only memory (ROM) device. In one embodiment of the present invention, mass store device 120 comprises one or more hard disk drives (HDD). In the illustrated embodiment, ICH 110 also provides an interface to an expansion bus bridge 134 to facilitate the attachment of additional I/O devices or peripheral components via an expansion bus such as a Peripheral Component Interconnect (PCI), Industry Standard Architecture (ISA), or Universal Serial (USB) bus (not illustrated).

Embodiments of the present invention may include software, information processing hardware, and various processing operations, further described herein. The features and process operations of the present invention may be embodied in executable instructions embodied within a machine-readable medium such as memory 112, mass store device 120, removable disk media coupled with floppy disk drive 126, a communications network available via network interface controller 118, or the like.

A machine-readable medium may include any mechanism that provides (i.e., stores and/or transmits) information in a form readable by a machine (e.g., data processing system 100). For example, a machine-readable medium includes but is not limited to: read only memory (ROM); random access memory (RAM); magnetic disk storage media; optical storage media; flash memory devices; electrical, optical, acoustical or other form of propagated signals (e.g., carrier waves, infrared signals, digital signals, etc.); or the like. The instructions can be used to cause a general or special purpose processor such as processor 102 or processor 117, programmed with the instructions, to perform methods or processes of the present invention. Alternatively, the features or operations of the present invention may be performed by specific hardware components that contain hard-wired logic for performing the operations, or by any combination of programmed data processing components and custom hardware components.

It should be appreciated that the present invention may be practiced utilizing a data processing system 100 having a greater or lesser number of components as the illustrated exemplary system. For example, data processing system 100 may comprise, in alternative embodiments of the present invention, one of a wide variety of server or client computer systems or devices such as a workstation, personal computer, "thin client" (i.e. network computer or NetPC), Internet appliance, terminal, palmtop computing device, robust cellular or Personal Communications Services (PCS) telephone, "thin server" (sometimes called an appliance server, application server, or specialty server), or the like. In one embodiment of the present invention data processing system 100 comprises a server computer system. In another embodiment of the present invention data processing system 100 comprises an electronic commerce accelerator network appliance for performing Secure Socket Layer (SSL) connections or encryption/decryption operations.

Figure 2:
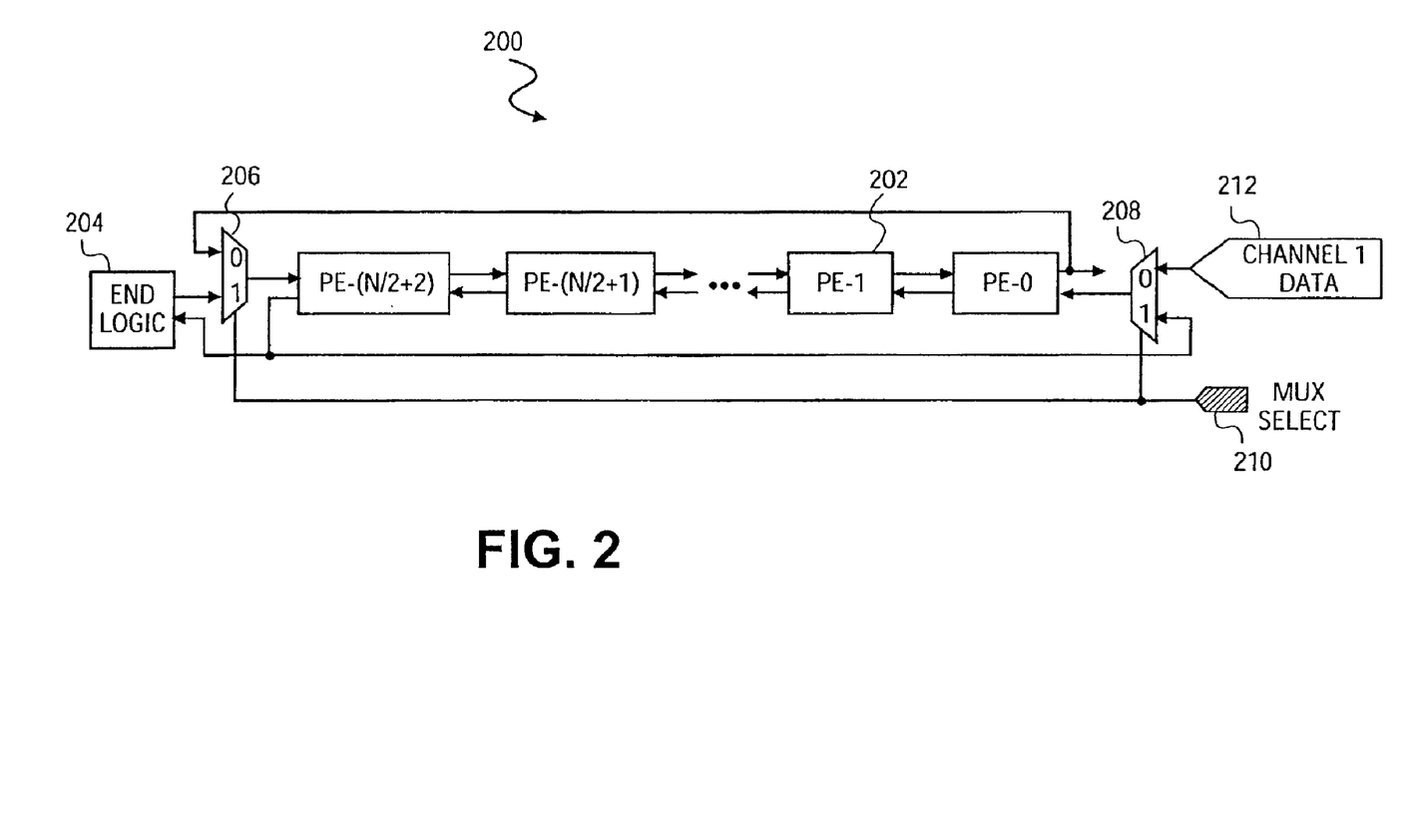
FIG. 2 illustrates a high-level block diagram of a modular multiplier according to a first embodiment of the present invention.

FIG. 2 illustrates a high-level block diagram of a modular multiplier 200 according to a first embodiment of the present invention. In the illustrated embodiment, modular multiplier 200 includes a plurality of processing elements such as processing element 202, terminating or "end" logic 204, and a coupling device including a first multiplexer 206 and a second multiplexer 208 according to the present invention.

While a wide variety of techniques and hardware implementations may be used to implement modular multiplication, the depicted modular multiplier 200 embodiment comprises a Montgomery multiplier constructed as a linear systolic array of processing elements with each processing element processing some number of bits of a Montgomery multiplication operation. For example, each processing element in the embodiment depicted in FIG. 2 operates on 4 bits of a Montgomery multiplication operation at a time. Ordinarily, the number of processing elements required would be equal to the number of digits, N, within the operands processed in the modular multiplication plus some number of additional processing elements to handle overflow conditions and ensure that appropriate inputs are supplied to the remainder of the array where the number of "digits" is equal to the number of bits, n, of each operand divided by the "radix" or number of bits processed per processing element.

Accordingly, in conventional modular multipliers, a 512-bit multiplication operation typically requires 132 4-bit processing elements while a 256-bit multiplication requires 68 4-bit processing elements. Alternatively, a modular multiplication operation may be accomplished utilizing one less processing element with the functionality of the final or "leftmost" processing element being incorporated into associated end logic. For example, end logic may be utilized including an "OR" logic gate to receive at least two carry bit signals from the next to last processing element and a flip-flop to register the logical "OR" gate output and provide it to the next to last processing element via an "S-in" intermediate result input. In the illustrated embodiment however, the number of processing elements required is reduced to that normally required to perform a modular multiplication operation on operands of half the size of those actually processed.

Within the context of the present invention, a plurality of modular multiplication operations each having the form A×B mod M, are "independent" if they differ by at least two of their three operands (i.e. 'A', 'B', and 'M'). Additionally, a modular multiplier's computation channels are described as being "independent" if they are each capable of concurrently performing at least one of a plurality of independent modular multiplication operations. It should also be appreciated that although the terms 'A', 'B', and 'M', are used throughout this disclosure to represent the parameters in a modular multiplication operation, these are generic designations and any other terms may be used without departing from the spirit and scope of the present invention.

In one embodiment of the present invention, the linear systolic array of processing elements comprises a plurality of independent computation channels including a first computation channel and a second computation channel capable of performing independent first and second modular multiplication operations of the form A1×B1 mod M1 and A2×B2 mod M2, respectively. One or more operands may be provided to the initial or "rightmost" processing element (labeled PE-0 in FIG. 2) and propagated systolically through the linear array of PEs from right to left to accomplish the described modular multiplication operations. It should be appreciated that with the context of this description, the term "operand" can include one or more entire modular multiplication operands (e.g. 'A', 'B', and/or 'M' operands) or any portion thereof such as a digit or individual binary bit.

In one embodiment, the modular multiplier is first initialized by propagating each operand B1, B2, M1, and M2, one digit at a time, through the multiplier until each operand is distributed throughout the processing elements of the linear systolic array. In another embodiment, multiples of each parameter B1, B2, M1, and M2 are calculated and then stored within some or all of the PEs of the systolic array. To perform the modular multiplication operations, an operand A1 is sequentially passed, one digit at a time, up the linear systolic array to PE-0, PE-1, PE-2, etc., in alternating clock cycles, to be processed with stored multiples of B1 and M1. In the intervening clock cycles, operand A2 is similarly passed through the array of processing elements to be processed with stored multiples of B2 and M2. When all digits of A1 and A2 have passed through the chain of processing elements, the multiplication operations are complete and the operation results, R1 and R2, are stored throughout the processing element array. The results R1 and R2 may then be passed back from left to right through the processing element array and received via PE-0.

During operation of the modular multiplier, a given processing element receives data from and provides data to both of its immediate (i.e. previous/right and next/left) neighboring PEs in the linear systolic array on each "clock" or pulse of the clock source (not illustrated). Each PE is provided with appropriate control signals and a digit of a first operand A1 during one clock cycle in order to perform a portion of one modular multiplication operation within the first computation channel, and is then provided with alternative control signals and a digit of a second operand A2 to perform a portion of another modular multiplication operation during the next clock cycle. In one embodiment, even-numbered PEs perform operations in a first modular multiplication in odd-numbered clock cycles and perform operations in a second modular multiplication in even-numbered clock cycles, while odd-numbered PEs perform operations in the first modular multiplication in the even-numbered clock cycles and in the second modular multiplication in the odd-numbered clock cycles. The operands and/or control signals applied and the computation channel that is "active" or operating therefore alternate with an applied clock and/or control signal.

In the embodiment illustrated in FIG. 2, rather than utilize the first and second independent computation channels to perform two distinct modular multiplication operations, the computation channels are combined to form a single "virtual" computation chain according to the present invention by feeding the end of the linear systolic array of processing elements back into the beginning of the array. The second computation channel is consequently utilized as a continuation of the first, effectively doubling the length of the linear systolic array while sacrificing one of the available multiplication channels. It should be appreciated however that in alternative embodiments of the invention the resulting effective linear systolic array length may be greater than or less than twice the original length. For example, embodiments of the invention may be implemented, in which a linear systolic array having more than two independent computation channels is utilized resulting in a longer effective array length. Similarly, an embodiment in which not all processing elements of a linear systolic array are utilized or included within the provided feedback loop may be implemented resulting in a shorter effective array length.

In the illustrated embodiment of FIG. 2, the first multiplexer 206 and second multiplexer 208 of the coupling device each operate based upon a received control signal, Mux Select 210. In one embodiment, Mux Select 210 alternates between a logical '1' and a logical '0'. Consequently, an input of the first or 'rightmost' processing element, coupled to the output of the second multiplexer 208 is alternately provided with a Channel 1 data source 212 coupled to a first input of second multiplexer 208 and an output of the final or leftmost processing element of the array coupled to a second input of second multiplexer 208. Similarly, utilizing Mux Select 210, an input of the final or 'leftmost' processing element, coupled to an output of the first multiplexer 206 of the coupling device is alternately provided with an output of end logic 204 or of the first or 'rightmost' PE, i.e. PE-0.

Accordingly, a feedback path is provided between the first and last processing elements of the illustrated linear systolic array using a coupling device of the present invention. The resulting fed-back computation channel is utilized such that a first portion of an n-bit modular multiplication operation is performed using the first independent computation channel and a second portion of the n-bit modular multiplication operation is performed using the second independent computation channel where the first and second computation channels are constructed using the number of processing elements ordinarily required to perform n/2-bit modular multiplication. In one embodiment, the first portion of the described modular multiplication operation is performed during a first time period and the second portion of the described modular multiplication operation is performed during a second time period where the first time period and the second timer period overlap.

Consequently, the static fed-back modular multiplier embodiment illustrated in FIG. 2 may be utilized to perform an n-bit modular multiplication operation using a linear systolic array having a number of processing elements ordinarily sufficient to perform an n/2-bit modular multiplication operation. For purposes of this description therefore, the processing elements of the illustrated array or chain will be referred to by number from 0 to N/2+2 from left to right starting with the first processing element, where N is equal to the number of digits within the operands processed in the modular multiplication. So for example, a 1024-bit modular multiplication operation, ordinarily requiring 259 4-bit processing elements plus end logic (i.e. 1024/4=N=256+3 additional PEs=259) would instead require 131 4-bit processing elements (N=256/2=128+3=131). In one embodiment of the present invention, a restriction exists requiring that the number of processing elements in the fed-back chain is odd so that data fed back from the end of the first computation channel arrives at the beginning of the second computation channel and hits otherwise idle computation cycles of the processing elements of the array and not busy cycles. In an alternative embodiment where an even number of processing elements is required in an array, an odd number of additional processing elements (e.g. one additional processing element) may be included within the array but outside of the feedback loop itself. The additional processing element (s) may be incorporated into the end logic or otherwise placed to the left of the feedback loop or alternatively to the right of the feedback loop, prior to second multiplexer 208.

It should be appreciated that the number of processing elements utilized, the number of bits processed per element, and the size of the modular exponentiators shown are arbitrary and may be varied in alternative embodiments. In one embodiment of the present invention, a dedicated 512-bit Montgomery multiplier, normally implemented as a dual-channel 131-PE chain, is instead implemented as a static single-channel fed-back 67-PE chain. In another embodiment of the present invention, a dual-channel 512-bit Montgomery multiplier implemented with a 131-PE chain is made additionally selectable to be capable of performing 1024-bit Montgomery multiplications utilizing a single-channel fed-back chain with the same number of processing elements. Thus, embodiments of the present invention generally allow modular multiplication and exponentiation operations to be performed utilizing fewer hardware resources than previously required.

Figure 3:
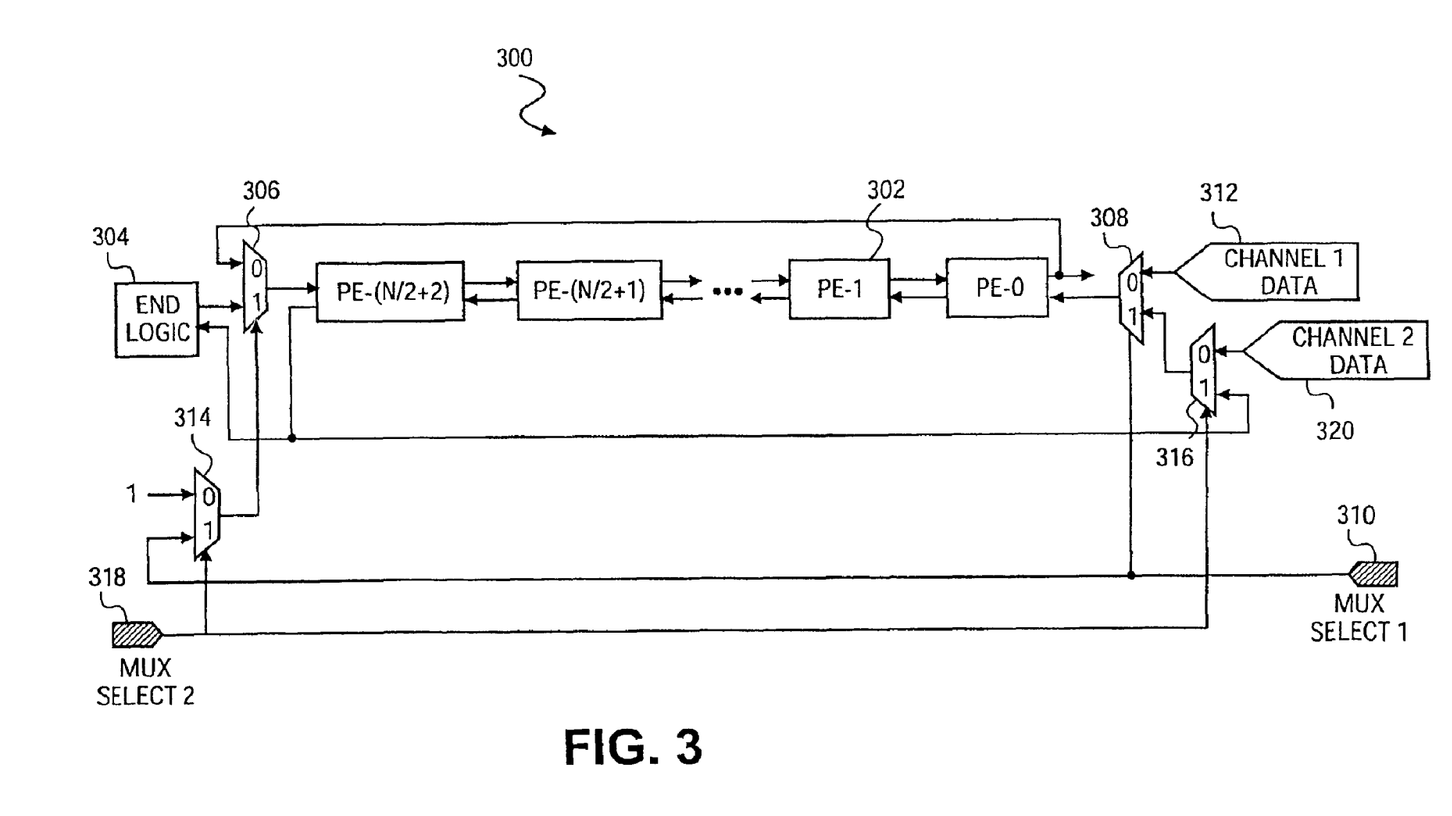
FIG. 3 illustrates a high-level block diagram of a modular multiplier according to a second embodiment of the present invention.

FIG. 3 illustrates a high-level block diagram of a modular multiplier 300 according to a second embodiment of the present invention. Modular multiplier 300 of FIG. 3 is substantially similar to modular multiplier 200 depicted in FIG. 2, including a plurality of processing elements such as processing element 302, terminating or "end" logic 304, and a coupling device including a first multiplexer 306 and a second multiplexer 308 receiving a Channel 1 data source 312 and a first control signal, Mux Select 1 310 as described with respect to FIG. 2 according to the present invention. However, modular multiplier 300 includes additional logic allowing the linear systolic array of processing elements to be selectively switched between at least two modes: a first, dual-channel mode where first and second independent computation channels of the linear systolic array are operably separated from one another and operate as two separate n-bit modular multipliers and a second, single, fed-back channel mode where the first and second computation channels are operably coupled together to operate as a single 2n-bit modular multiplier.

More specifically, the coupling device of the modular multiplier 300 of the embodiment of FIG. 3 includes a third multiplexer 314 and a fourth multiplexer 316 to receive a logical '1' signal, a Channel 2 data source 320, and an additional control signal, Mux Select 2 318, and to selectively couple the first and second computation channels of modular multiplier 300's linear systolic array of processing elements together in response to a state of Mux Select 2 control signal 318. In the illustrated embodiment, when the Mux Select 2 318 control signal is in a first, i.e. logical '0' state, the feedback path previously described with respect to FIG. 2 is broken and first and second independent computation channels of modular multiplier 300 operate independently, alternating between two separate modular multiplication operations associated with the Channel 1 312 and Channel 2 320 data sources. By contrast, when the Mux Select 2 318 control signal is in a second, i.e. logical '1' state, the feedback path previously described is completed and the first and second computation channels are combined as previously described to operate as a single modular multiplication computing chain. It should be readily appreciated that various other implementations to achieve a similar result are contemplated in alternative embodiments of the present invention and fully within the broader spirit and scope thereof.

Figure 4:
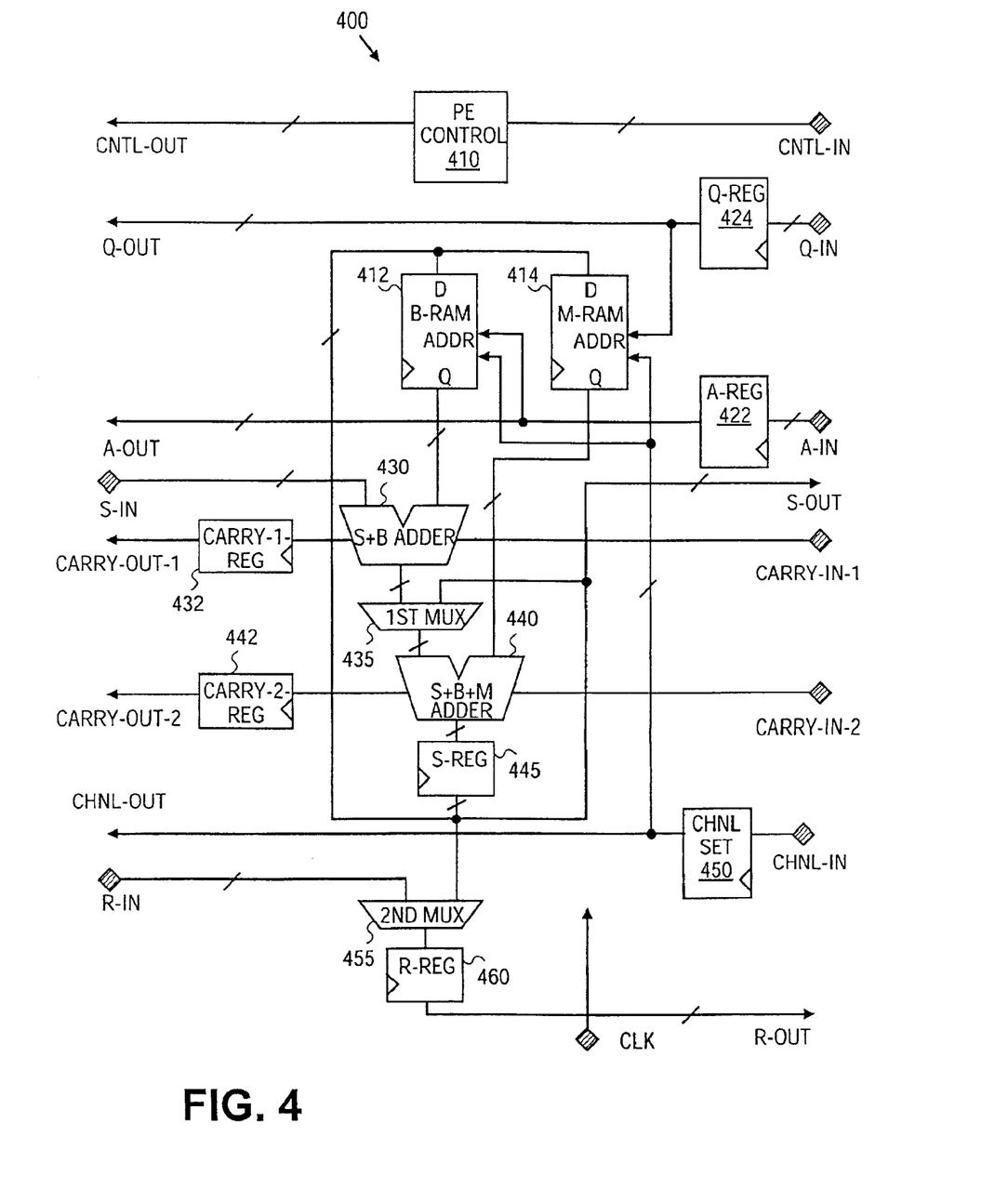
FIG. 4 illustrates a high-level block diagram of a processing element according to an embodiment of the present invention.

FIG. 4 illustrates a high-level block diagram of a processing element according to an embodiment of the present invention. In the illustrated embodiment of FIG. 4, a processing element 400, such as PE 202 of FIG. 2 or PE 302 of FIG. 3 includes two storage elements (B-RAM 412 and M-RAM 414), and processing logic that includes PE control logic 410, two address registers (Q-register 424 and A-register 422), two adders (S+B Adder 430 and S+B+M Adder 440), two multiplexers (first multiplexer 435 and second multiplexer 455), two carry registers (Carry-1-register 432 and Carry-2-register 442), an accumulation register (S-register 445), a channel select register 450, and a results register (R-register 460). Although a single PE 400 is described, in one embodiment PE 400 is generic to every processing element within a given modular multiplier computation chain.

In the illustrated embodiment, with the exception of the first or "rightmost" processing element and the last or "leftmost" processing element in a linear systolic array, connections shown at the bottom of FIG. 4 are common to multiple PEs, connections shown to the right interface with the PE to the right, and connections shown to the left interface with the PE to the left, with outputs from one PE connected to similarly-named inputs of the adjacent PE. The first and last processing elements, (e.g. PE-0 and PE-N/2+2 in FIGS. 2 and 3, respectively) of a linear systolic array share the common connections shown at the bottom of the illustrative processing element 400 with the remaining PEs of their processing chain. Similarly, the first PE's connections on the left interface with the PE to its left and the last PE's connections on the right interface with the PE on its right as described above. The remaining connections of these processing elements vary from that of the other PEs however. Connections illustrated at the right of the exemplary processing element (i.e. Cntl-In, Q-In, A-In, S-Out, Carry-In-1, Carry-In-2, Chnl-In, and R-Out) for example, interface alternately with both a controller or other data source (not illustrated) and the connections illustrated on the left of the last processing element for the first processing element. Similarly, the connections illustrated at the left of the exemplary processing element (i.e. Cntl-Out, Q-Out, A-Out, S-In, Carry-Out-1, Carry-Out-2, Chnl-Out, and R-In) interface alternately with end logic (not illustrated) and the connections illustrated on the right of the first processing element for the final processing element according to one embodiment of the present invention.

In one embodiment Clk, Carry-In-1, Carry-Out-1, Carry-In-2, Carry-Out-2, Chnl-In, Chnl-Out, and all internal connections to propagate those signals contain one bit each, while Cntl-In and Cntl-Out contain the number of bits necessary to identify each of a plurality of control codes. All remaining connections shown in FIG. 4 contain the number of bits being processed by each PE, such as four bits each for the illustrated embodiment. In one embodiment of the present invention, each PE 400 also includes other inputs and outputs as necessary, e.g., a Reset input (not illustrated).

In one embodiment, the various logic elements of FIG. 4 perform the following operations: Control logic 410 latches a control code received from the PE to the right, uses that control code to control the logic elements of the present PE during a current clock cycle, and then passes the control code to the PE to the left. Storage element B-RAM 412 is used to store one digit of each multiple of B that is stored in the PE chain, while storage element M-RAM 414 is used to store one digit of each multiple of M that is stored in the PE chain. A-register 422 and Q-register 424 hold addresses which select desired locations within B-RAM 412 and M-RAM 414, respectively, (both for reading and for writing) and pass these addresses to the PE to the left. S+B Adder 430 is used to add the contents of a selected location in B-RAM 412 to the contents of the S-register in the PE to the left, including any carry bit received through the Carry-In-1 input from the S+B Adder in the PE to the right. Carry-1-Register 432 latches any carry bit from S+B Adder 430 and provides it as a carry bit to the S+B Adder in the PE to the left during the next clock cycle.

When the left-hand input of first multiplexer 435 is selected, S+B+M Adder 440 adds the output of S+B Adder 430 to the contents of a selected location in M-RAM 414. When the right-hand input of first multiplexer 435 is selected, S+B+M Adder 440 adds the contents of S-Register 445 to the contents of the selected location in M-RAM 414. Any received carry bit is provided from the PE to the right through the Carry-In-2 input, and any generated carry bit is latched into Carry-2-Register 442 for use by the PE to the current PE's left in the next clock cycle. The output of S+B+M Adder 440 is latched into S-register 445, which acts as an accumulation register for interim results. The output of S-register 445 is distributed to each of B-RAM 412, M-RAM 414, first multiplexer 435, and the S-Out output for use by the PE to the right. R-register 460 latches the output of S-register 445 if the right-hand input of second multiplexer 455 is selected, and otherwise latches the contents of the R-register in the PE to the left. Channel select register 450 is coupled to an address bit of both B-RAM 412 and M-RAM 414 to select either a first bank of addresses or a second bank of addresses in both storage elements. Within each bank, A-register 422 and Q-register 424 select specific locations as described above. In one embodiment, the channel selection values are propagated from right to left through the Channel select registers 450 of the processing elements along with the values in the A- and Q-registers. In one embodiment, the channel selection values are part of the control codes.

In the embodiment of FIG. 4, Clk is used to latch data into the Control logic, into the Q-, A-, S-, R-, Carry-1- and Carry-2-, and Channel Select registers, and to clock write operations in the B- and M-RAMs, while both adders, both multiplexers, and the read operations in the B- and M-RAMs are combinatorial, i.e., any change at an input is propagated through to the logic element's output regardless of clock status. In another embodiment, the B- and M-RAMs use a clocked input for read as well as write operations. In one embodiment, clock speed is chosen so that worst-case combinatorial delays in PE 210 are less than one clock cycle. Specific connections from the Clk input to other circuit elements is not shown in FIG. 4 to avoid making the figure overly complex.

Control logic 410 contains the logic necessary to control the operation of PE 400, based on control codes received through Cntl-In. In one embodiment, control logic 410 includes a decoder circuit to convert the control code to necessary control signals. In another embodiment, the control code is simply latched, with each bit of the control code specifying a particular control signal. In one embodiment, the control codes specify operations that include but are not limited to: selecting one of the two inputs of first multiplexer 435, selecting one of the two inputs of second multiplexer 455, writing to B-RAM 412, writing to M-RAM 424, resetting one or more of the A, Q, S, and R registers, and inhibiting the clock signal to various logic elements.

Because a Montgomery multiplication operates with multiples of B and M, one embodiment pre-calculates the multiples within the PEs, using the same logic that is used for the Montgomery multiplication. In the illustrated embodiment of FIG. 4, the storage elements include random access memories (RAM), labeled B-RAM and M-RAM to indicate the parameters being stored. Even though the terms 'B-RAM' and 'MRAM' are used throughout the disclosure, in some embodiments, types of storage elements other that RAM are used. Collectively, all the B-RAMs 412 in the PE chain provide a first bank of storage space for values of (0×B1), (1×B1), (2×B1), etc., and a second bank of storage space for values of (0×B2), (1×B2), (2×B2), etc. In one embodiment in which each PE operates on a hexadecimal digit, B-RAM 412 includes 32 4-bit storage locations, 16 locations to hold the digits of (0×B1) through (15×B1) and another 16 locations to hold corresponding digits of (0×B2)

through (15×B2). Similarly in the same embodiment, M-RAM 414 includes 32 4-bit storage locations to hold corresponding digits of (0×M1) through (15×M1) and (0×M2) through (15×M2). In an embodiment in which each PE processes a number of bits other than four, the number of locations in each RAM are changed accordingly to address and store the required number of multiples for each set of parameters.

In some embodiments, a single value of a given parameter is always used for both Montgomery multiplications. In these embodiments, the corresponding storage element provides storage for multiples of only the single value of the parameter, and the connection from Channel select register 450 to that storage element is eliminated so that both Montgomery multiplications read from the same bank of operand multiples. In one such embodiment, M-RAM 414 contains sixteen locations to store a digit of the multiples (0×M) through (15×M), and Channel select register 450 does not control an address input line to M-RAM 414. An embodiment that is designed to hold two independent values of M can also be used for applications that have a single value of M by making M1 and M2 the same.

In one embodiment, when PE 400 is alternating between the first and second channels on every clock cycle during two concurrent Montgomery multiplication operations, the signal Chnl-In is a square wave with half the frequency of Clk, so that the output of Channel select register 450 oscillates between high and low on alternating clock cycles. This action alternates between the first and second banks of storage locations in B-RAM 412 and M-RAM 414 with each clock cycle. It should be readily appreciated that the various single inputs and outputs described with respect to FIGS. 2 and 3 may each map to one or more of the inputs and outputs described with respect to the processing element 400 of FIG. 4.

Figure 5:
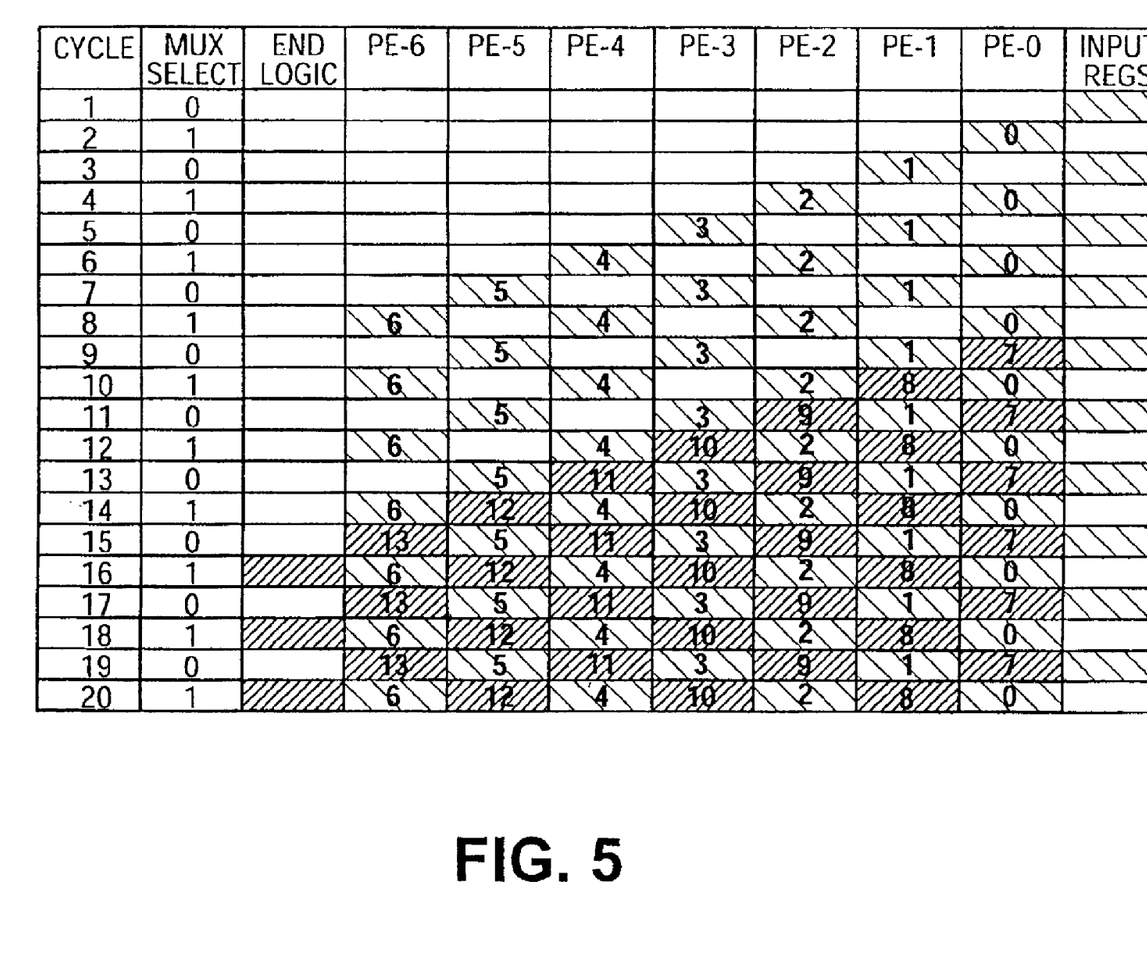
FIG. 5 illustrates a data flow diagram of a modular multiplication operation through a modular multiplier according to one embodiment of the present invention.

FIG. 5 illustrates a data flow diagram of a modular multiplication operation through a modular multiplier according to one embodiment of the present invention. While a single modular multiplication operation utilized in conjunction with standard cryptographic bit-lengths can require hundreds of processing elements and thousands of clock cycles to complete, a simplified modular multiplier including only seven processing elements has been depicted in FIG. 5 in order to avoid making the illustrated diagram overly complex. In the illustrated table of FIG. 5, shaded regions show cycles when data is registered, be it in a processing element, end logic, or in "Channel 1" input registers feeding the first processing element (i.e. PE-0). Darker shading shows data registered within the lower half of the virtual (double length) chain and lighter shading shows data registered within the upper half. Additionally, numbers within each table cell or element indicate the chain position that a processing element effectively services in each cycle—thus, for example, in cycle 8 the depicted modular multiplication computation reaches PE-6, and in cycle 9 data from PE-6 wraps around to what is physically PE-0, but functions as the next processing element, PE-7.

Figure 6:
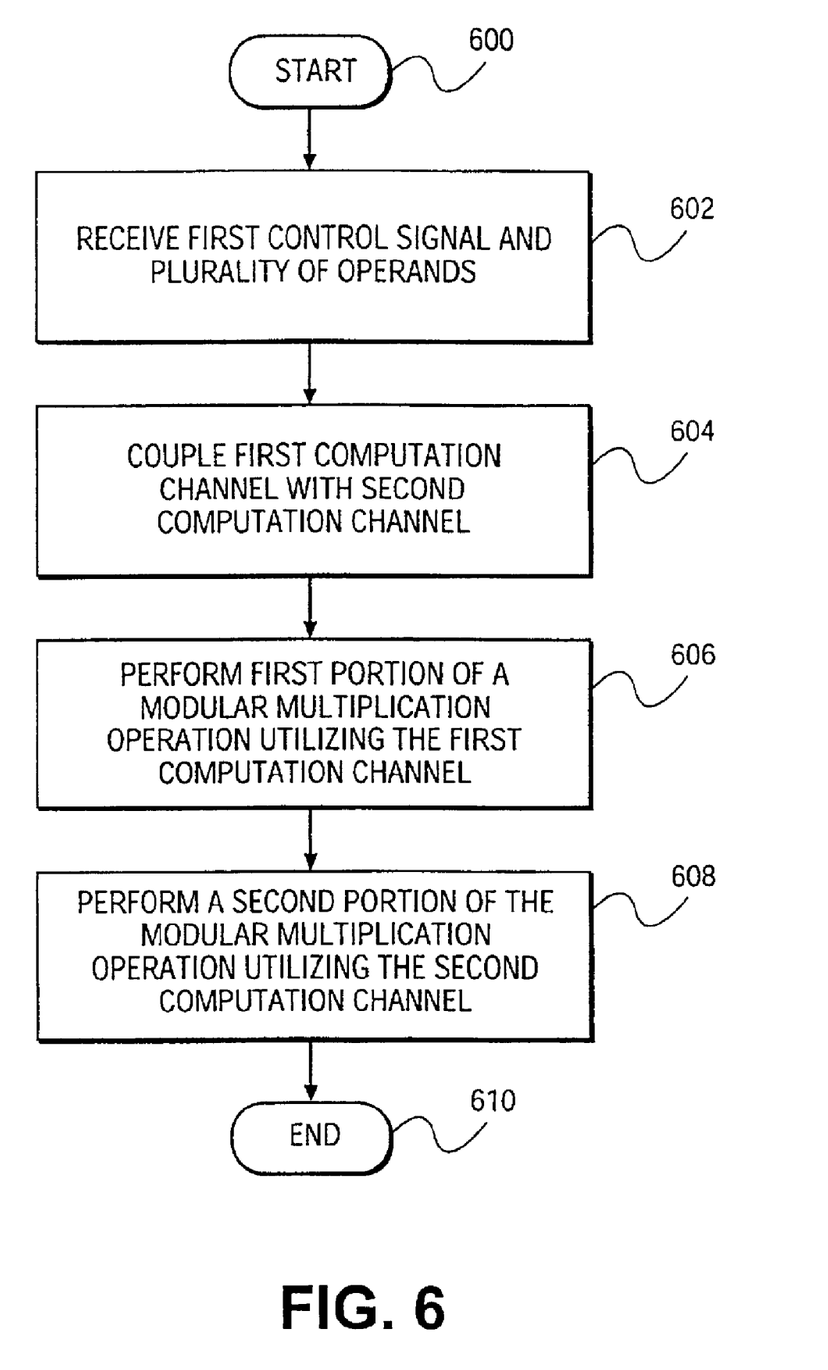
FIG. 6 illustrates a high-level process flow diagram for one embodiment of the present invention.

FIG. 6 illustrates a high-level process flow diagram for one embodiment of the method of the present invention for performing a modular multiplication operation on a plurality of operands utilizing a modular multiplier including a first independent computation channel and a second independent computation channel. The process illustrated by FIG. 6 begins (block 600), and then a plurality of operands and a first control signal such as the Mux Select signal 210 of FIG. 2 or the Mux Select 1 signal 310 of FIG. 3 is received (block 602). Next, the first and second independent computation channels are coupled together utilizing a coupling device according to the present invention (block 604). Thereafter, a first portion of a modular multiplication operation is performed using the first computation channel (block 606) and a second portion of the modular multiplication operation is performed using the second computation channel (block 608) prior to the illustrated process terminating (block 610).

In the foregoing description, the present invention has been described with reference to specific exemplary embodiments thereof. It will be apparent however, that variations or modification of the exemplary embodiments described as well as alternative embodiments of the present invention may be implemented without departing from the broader spirit or scope of the present invention as defined in the appended claims. The specification and drawings are accordingly to be regarded in an illustrative rather than a restrictive sense.

What is claimed is:

1. An apparatus comprising:
a modular multiplier including a plurality of independent computation channels, said plurality of independent computation channels including a first computation channel and a second computation channel each capable of performing an independent modular multiplication operation; and
a coupling device interposed between said first computation channel and said second computation channel to receive a first control signal and to couple said first computation channel to said second computation channel in response to a receipt of said first control signal.

2. The apparatus as set forth in claim 1, wherein said modular multiplier comprises a linear systolic array of processing elements, said linear systolic array of processing elements including said plurality of independent computation channels.

3. The apparatus as set forth in claim 1, wherein said coupling device comprises a coupling device to receive a second control signal and to selectively couple said first computation channel to said second computation channel in response to a state of said second control signal.

4. The apparatus as set forth in claim 3, said apparatus having a first mode of operation corresponding to a first state of said second control signal wherein said first computation channel is operably separated from said second computation channel and a second mode of operation corresponding to a second state of said second control signal wherein said first computation channel is operably coupled to said second computation channel via said coupling device.

5. The apparatus as set forth in claim 4, wherein said first computation channel and said second computation channel operate as two n-bit modular multipliers in said first mode of operation and as a single 2n-bit modular multiplier in said second mode of operation, where n is an integer.

6. The apparatus as set forth in claim 5, where n is 512.

7. The apparatus as set forth in claim 1, wherein said modular multiplier comprises a Montgomery multiplier.

8. The apparatus as set forth in claim 1, wherein said a coupling device comprises a first multiplexer coupled between an output of said first computation channel and an input of said second computation channel and a second multiplexer coupled between an output of said second computation channel and an input of said first computation channel.

9. The apparatus as set forth in claim 1, wherein said first computation channel and said second computation channel operate as two modular multipliers in a first mode of operation and as a single modular multiplier in a second mode of operation.

10. A processor comprising:
a modular multiplier including a plurality of independent computation channels, said plurality of independent computation channels including a first computation channel and a second computation channel each capable of performing an independent modular multiplication operation; and
a coupling device interposed between said first computation channel and said second computation channel to receive a first control signal and to couple said first computation channel to said second computation channel in response to a receipt of said first control signal.

11. The processor as set forth claim 10, wherein said coupling device comprises a coupling device to receive a second control signal and to selectively couple said first computation channel to said second computation channel in response to a state of said second control signal.

12. The processor as set forth in claim 11, said processor having a first mode of operation corresponding to a first state of said second control signal wherein said first computation channel is operably separated from said second computation channel and a second mode of operation corresponding to a second state of said second control signal wherein said first computation channel is operably coupled to said second computation channel via said coupling device.

13. The processor as set forth in claim 12, wherein said first computation channel and said second computation channel operate as two n-bit modular multipliers in said first mode of operation and as a single 2n-bit modular multiplier in said second mode of operation, where n is an integer.

14. The processor as set forth in claim 13, where n is 512.

15. The processor as set forth in claim 10, wherein said modular multiplier comprises a Montgomery multiplier.

16. The processor as set forth in claim 10, wherein said a coupling device comprises a first multiplexer coupled between an output of said first computation channel and an input of said second computation channel and a second multiplexer coupled between an output of said second computation channel and an input of said first computation channel.

17. The processor as set forth in claim 10, wherein said modular multiplier comprises a linear systolic array of processing elements, said linear systolic array of processing elements including said plurality of independent computation channels.

18. The processor as set forth in claim 10, wherein said first computation channel and said second computation channel operate as two modular multipliers in a first mode of operation and as a single modular multiplier in a second mode of operation.

19. A system comprising:
a memory to store data and instructions;
a first processor coupled to said memory to process data and execute instructions;
a second processor coupled to said memory, said second processor comprising:
a modular multiplier including a plurality of independent computation channels, said plurality of independent computation channels including a first computation channel and a second computation channel each capable of performing an independent modular multiplication operation; and
a coupling device interposed between said first computation channel and said second computation channel to receive a first control signal and to couple said first computation channel to said second computation channel in response to a receipt of said first control signal.

20. The system as set forth in claim 19, wherein said modular multiplier comprises a linear systolic array of processing elements, said linear systolic array of processing elements including said plurality of independent computation channels.

21. The system as set forth in claim 19, wherein said coupling device comprises a coupling device to receive a second control signal and to selectively couple said first computation channel to said second computation channel in response to a state of said second control signal.

22. The system as set forth in claim 21, said second processor having a first mode of operation corresponding to a first state of said second control signal wherein said first computation channel is operably separated from said second computation channel and a second mode of operation corresponding to a second state of said second control signal wherein said first computation channel is operably coupled to said second computation channel via said coupling device.

23. The system as set forth claim 22, wherein said first computation channel and said second computation channel operate as two n-bit modular multipliers in said first mode of operation and as a single 2n-bit modular multiplier in said second mode of operation, where n is an integer.

24. The system as set forth in claim 19, wherein said a coupling device comprises a first multiplexer coupled between an output of said first computation channel and an input of said second computation channel and a second multiplexer coupled between an output of said second computation channel and an input of said first computation channel.

25. The system as set forth in claim 19, wherein said first computation channel and said second computation channel operate as two modular multipliers in a first mode of operation and as a single modular multiplier in a second mode of operation.

26. A method comprising:
receiving a first control signal and a plurality of operands; and
performing a modular multiplication operation on said plurality of operands utilizing a modular multiplier including a plurality of independent computation channels, said plurality of independent computation channels including a first computation channel and a second computation channel each capable of performing an independent modular multiplication operation, wherein performing said modular multiplication operation comprises:
coupling said first computation channel with said second computation channel in response to receiving said first control signal;
performing a first portion of said modular multiplication operation utilizing said first computation channel; and
performing a second portion of said modular multiplication operation utilizing said second computation channel.

27. The method as set forth in claim 26, wherein performing a modular multiplication operation comprises performing a modular multiplication operation on said plurality of operands utilizing a modular multiplier including a linear systolic array of processing elements, said linear systolic array of processing elements including said plurality of independent computation channels.

28. The method as set forth in claim 26, wherein:
performing a first portion of said modular multiplication operation comprises providing said plurality of operands to said first computation channel and processing said plurality of operands utilizing said first computation channel to produce an intermediate result;

coupling said first computation channel with said second computation channel comprises providing said intermediate result to said second computation channel; and performing a second portion of said modular multiplication operation comprises processing said intermediate result utilizing said second computation channel.

29. The method as set forth in claim 26, said method further comprising receiving a second control signal, wherein coupling said first computation channel with said second computation channel comprises selectively coupling said first computation channel with said second computation channel in response to receiving said second control signal.

30. A machine-readable medium having a plurality of machine-executable instructions embodied therein which when executed by a machine, cause said machine to perform a method comprising:

receiving a first control signal and a plurality of operands; and performing a modular multiplication operation on said plurality of operands utilizing a modular multiplier including a plurality of independent computation channels, said plurality of independent computation channels including a first computation channel and a second computation channel each capable of performing an independent modular multiplication operation, wherein performing said modular multiplication operation comprises:

coupling said first computation channel with said second computation channel in response to receiving said first control signal;

performing a first portion of said modular multiplication operation utilizing said first computation channel; and performing a second portion of said modular multiplication operation utilizing said second computation channel.

31. The machine-readable medium as set forth in claim 30, wherein performing a modular multiplication operation comprises performing a modular multiplication operation on said plurality of operands utilizing a modular multiplier including a linear systolic array of processing elements, said linear systolic array of processing elements including said plurality of independent computation channels.

32. The machine-readable medium as set forth in claim 30, wherein:

performing a first portion of said modular multiplication operation comprises providing said plurality of operands to said first computation channel and processing said plurality of operands utilizing said first computation channel to produce an intermediate result;

coupling said first computation channel with said second computation channel comprises providing said intermediate result to said second computation channel; and performing a second portion of said modular multiplication operation comprises processing said intermediate result utilizing said second computation channel.

33. The machine-readable medium as set forth in claim 30, said method further comprising receiving a second control signal, wherein coupling said first computation channel with said second computation channel comprises selectively coupling said first computation channel with said second computation channel in response to receiving said second control signal.

34. A method comprising:

receiving a data value at a first end of a systolic array multiplier from a second end of the systolic array multiplier, wherein receiving a data value at a first end of a systolic array multiplier from a second end of the systolic array multiplier comprises:

receiving a data value from a second end of the systolic array multiplier at a first input of a multiplexer;

receiving a channel data input signal at a second input of the multiplexer; and providing either the data value from the second end of the systolic array multiplier or the channel data input signal to the first end of a systolic array multiplier via an output of the multiplexer.

35. The method of claim 34, further comprising:

processing data in processing elements, which operate on a given problem during alternating cycles of a clock signal.

* * * * *